April 1, 1958   M. H. GROSSMAN   2,828,667
MOVING PICTURE SCREEN
Filed Feb. 1, 1954
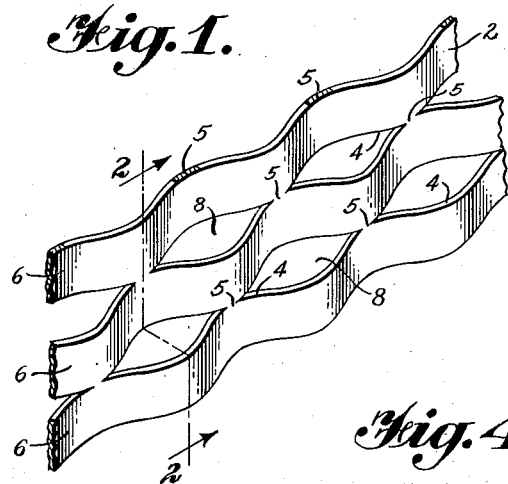
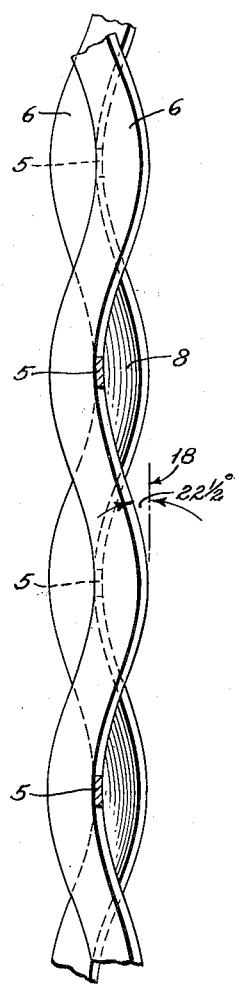
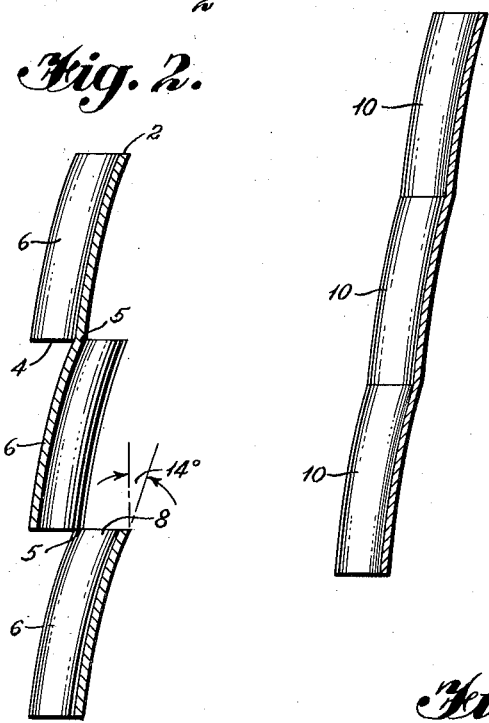
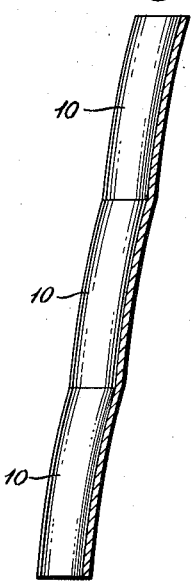
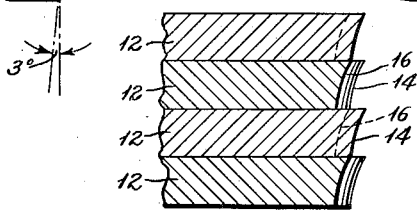
INVENTOR
*Milton H. Grossman*
BY *Bacon & Thomas*
ATTORNEYS

United States Patent Office 2,828,667
Patented Apr. 1, 1958

2,828,667

MOVING PICTURE SCREEN

Milton H. Grossman, Buffalo, N. Y.

Application February 1, 1954, Serial No. 407,427

9 Claims. (Cl. 88—28.9)

This invention relates to moving picture screens, and particularly to screens having characteristics enhancing high contrast between light and dark areas of the projected image, rendering the screen particularly useful in outdoor theatres where it is desired to project moving pictures thereon during conditions of high ambient light, particularly such conditions described as "partial daylight." The screen of the present invention has been found to be eminently satisfactory for this purpose and thus enables outdoor theatres to start their evening shows before complete darkness and permits the completion of two complete showings of a feature picture at a reasonable hour.

In general, the screen of the present invention may be arranged as a substantially vertical screen or as a screen sloped with its uppermost edge forwardly. The image reflecting face of the screen comprises narrow strips or elongated surfaces extending horizontally across the screen, each of the surface strips being of wave form undulating in a direction generally normal to the front face of the screen as a whole. Each of the elongated wavy surfaces is further concave in a transverse direction for concentrating reflected light. With a screen construction of this type the wavy surface of each strip functions essentially as a multiplicity of small reflecting lenses whereby a discrete ray or spot of light is reflected to each viewer from each of the wave crests and from each of the troughs thereof. Each of the surface strips is further inclined generally forwardly at the top to enable a more advantageous positioning of the projector and to effect "shading" of the image reflecting surface from ambient light. The wave form of the surface strips effects a wire range of lateral reflection to viewers off to one side of the screen.

A further feature of the present invention resides in the nature of the reflecting surface itself. The surface is essentially a polished specular reflecting surface of dark color and may be blackened metal or "blue" metal but may be of any other desired material. Preferably, the material is non-corrosive to prevent deterioration during periods of exposure due to inclement weather. The reflecting surface may be provided with a slight vertical "graining" or minute scratches running vertically to at least partially diffuse light deflected horizontally but to reflect light approaching the screen from above without diffusion thereof.

The present invention also contemplates such a screen constructed of die-formed sheet metal or the like wherein essentially horizontal openings are provided into which ambient light is reflected and absorbed without reflecting the same to the viewing audience.

It is contemplated that a great number of such horizontal wave-form strips be provided on each screen whereby the discrete spots of light reflected to the viewing audience will not be individually discernible but the reflected image will appear as a continuous image.

It is therefore an object of this invention to provide a moving picture screen especially adapted to produce high contrast even during periods of partial daylight.

It is another object of this invention to provide surface characteristics for a moving picture screen that may be readily adapted for use with vertical or forwardly sloping screens without changing the basic characteristics of the surface.

It is still another object of this invention to provide a moving picture screen providing for the absorption of ambient light other than that intentionally projected thereon.

It is a further object of this invention to provide a moving picture screen having the described characteristics in specific simple embodiments of economical construction.

It is a still further object of this invention to provide a moving picture screen of a dark color but having a highly reflective surface to enhance contrast during periods of high ambient light.

An additional object of this invention is to provide an elemental component exhibiting all of the fundamental principles of the present invention and from which moving picture screens of many desired designs and sizes may be assembled.

Other objects and advantages will become apparent to those skilled in the art as the description proceeds in connection with the accompanying drawings, wherein:

Fig. 1 is a fragmentary perspective view of a portion of the image reflecting face of a screen constructed in accordance with the present invention;

Fig. 2 is a vertical sectional view, on an enlarged scale, of the embodiment of Fig. 1 taken substantially along the line 2—2 of Fig. 1.

Fig. 3 is a top plan view of a fragmentary portion of the screen of Fig. 1 but shown on an enlarged scale;

Fig. 4 is a vertical sectional view, similar to Fig. 2, but showing a modified form of screen; and Fig. 5 is a fragmentary vertical sectional view through a still further embodiment.

The embodiment shown in Fig. 1 may be constructed from a sheet 2 of metal having the desired light reflecting characteristics and/or color. In constructing a screen of this embodiment the sheet of metal 2 is provided with a multiplicity of slits 4 therethrough. The slits 4 are arranged in parallel rows and the slits of each row are spaced longitudinally thereof with their adjacent ends in relatively close proximity, leaving uncut portions 5 of very limited transverse area between the slits of each row. The rows of slits define the edge portions of elongated narrow strips 6, which in the installed screen run horizontally thereacross. The sheet 2 is bent transversely of its plane adjacent each of the slits 4, the material on opposite sides of each slit being bent in opposite directions to produce a structure quite similar to the well known "expanded metal" devices. In bending the material of sheet 2 as described, each strip 6 is bent to wave form in which the surface thereof undulates in a direction transverse to the surface of the metal sheet. It is contemplated that the wave form be impressed in the strips 6 simultaneously with the cutting of the slits 4 by suitable dies, rolls or the like. In addition to impressing the described wave form on each of the strips, each strip is further bent in a transverse direction whereby the reflecting surface thereof is substantially uniformly concave in a direction transverse to the length of the strip. In other words, each strip is concave in vertical section at every point along its length. This feature is best shown in Fig. 2.

As is apparent from Fig. 1, the image reflecting face of the screen comprises individual horizontally extending strips integrally joined at their edges and each being of wave form. The slits 4 in each row are in "staggered" relation to the slits in adjacent rows so that in the final form the lowermost edge portions of the wave crests of each strip are integrally joined to the uppermost edges of the trough portions of the wave in the strip immediately therebelow.

Referring now to Fig. 2, which is a substantially vertical section through a portion of Fig. 1, it will be seen that the uppermost edge of each strip 6 is positioned forwardly (in the direction of the image reflecting face of the screen) from that portion of the lowermost edge thereof immediately therebelow. In general, it can be said that each strip slopes generally upwardly and forwardly from the vertical. Due to the transverse concavity of each strip 6, the upper edge portions thereof slope forwardly from the vertical at a greater angle than the lowermost edge portions, even though the lowermost edge portions do slope forwardly from the vertical. As indicated in Fig. 2, it is contemplated that the upper edge portions of each strip slope forwardly at an angle of about 14° from the vertical while the lowermost edges slope forwardly at an angle of about 3° from the vertical. The angles thus specified are not critical and may be varied within wide limits, depending upon the elevation of the projector relative to the screen and other factors.

The arrangement described in connection with Figs. 1 and 2 is contemplated when it is desired to produce a moving picture screen to be placed with its image reflecting face substantially vertical. It will be evident from Figs. 1 and 2 that the material laterally bent adjacent the slits 4 defines a multiplicity of openings 8 through the screen and the boundaries of each of those openings defines a substantially horizontal plane. In other words each opening faces almost directly upwardly and is not seen by the viewing audience.

Due to the arrangement described, it will be apparent that since the upper edge of each strip 6 "overhangs" the lower edge thereof, that the surface of the strip is somewhat shaded from ambient light reaching the screen from the sky. That ambient light reaching the screen from above that does impinge on the reflecting surface of each strip is reflected downwardly thereby into and through the openings 8, where it may be absorbed or dispersed without being reflected to the viewing audience and without interfering with the reflection of the desired image. Since the reflecting surface of each strip 6 is of a dark color it will be apparent that, even during partial daylight, high contrast between the light and dark portions of the image is provided.

The embodiment of Fig. 4 comprises a multiplicity of horizontally extending strips 10, each being identical in shape and configuration with those described in connection with Figs. 1 and 2 but in this embodiment the crests and troughs of adjacent strips are not arranged in "staggered" relation. The crests of the waves in each strip are directly above the crests of the waves in the strip next below. When a moving picture screen of this embodiment is assembled and installed, it is contemplated that it be arranged with the upper and lower edge portions of each strip bearing the same angular relationship to the vertical as described in connection with Fig. 2. Thus each strip slopes upwardly and outwardly from the strip therebelow and the image reflecting face of the screen as a whole therefore slopes upwardly and forwardly from the vertical. The forward slope of the screen as a whole, coupled with the characteristics of the individual strips, thus effect a highly effective "shading" of the entire screen from ambient light and the entire screen appears dark to the viewers in the absence of a picture image thereon, due to the dark color of the screen itself. It is contemplated that, with the embodiment of Fig. 4, the image reflecting face of the screen will slope forwardly from the vertical about 7 to 12°.

The embodiment of Fig. 4 may be constructed from relatively large sheets of metal stamped to the desired configuration and consisting of a multiplicity of strips 10 all integrally joined along their adjacent edges. However, it is within the scope of this invention that the strips 10 of Fig. 4 be individually formed and joined in the described relationship by any suitable means.

In both the embodiments of Figs. 1 and 4 the entire moving picture screen may consist of a great number of separate panels mounted on a common support, each panel being formed as an integral structure of convenient size. It is customary for the screens of outdoor theatres to be quite large, about 45 feet in height.

It is to be noted that even a screen of the embodiment of Fig. 1 may be constructed of individual separate strips 6 assembled in the described relationship without forming panels consisting of a plurality of integrally joined strips.

The modification illustrated in Fig. 5 illustrates a screen constructed from a plurality of separate plate-like laminations 12 of any suitable material of substantial thickness. Preferably, the thickness of each lamination 12 is equal to the desired width of each of the elongated narrow reflecting strips. The laminations 12 may be of any desired width and are superimposed and secured together in any suitable manner. The exposed edge portions of the laminations (shown at the right hand side of Fig. 5) are formed, either by casting, machining, or the like, to the shape described for each of the narrow strips in connection with Figs. 1 through 4. In other words, the edge of each of the laminations 12 is of wave form having alternate crests 14 and troughs 16 extending generally vertically transversely across those edges. The surfaces defined by each of the wave-shaped edge portions is further transversely concave as shown.

The laminations 12 may be selectively so arranged relative to each other that the crests and troughs of adjacent waves are in "staggered" relation, corresponding to the surface relationships shown in Figs. 1 and 2 or they may be so positioned that the waves bear the relationship to each other illustrated in Fig. 4. It will thus be seen that identical elemental components, constituting the single laminations with the described edge, may be selectively arranged to form a screen having either a vertical image reflecting face or a forwardly sloped screen face.

Fig. 5 illustrates the laminations 12 so arranged as to produce an image reflecting face of the type shown in Fig. 1. It is apparent that such an arrangement will result in exposing portions of the upper surface of each lamination. The portions of the upper surface of each lamination adjacent the crests in its waves is exposed in the space defined by the trough portions of the wave immediately thereabove. In the embodiment of Fig. 1 ambient light reflected downwardly by the strips passes through the openings 8. The Fig. 5 embodiment is not provided with such openings so it, therefore, becomes necessary to so treat the exposed upper surfaces of the laminations that they are nonreflective and preferably completely absorb all light reflected thereto. Any suitable blackened and preferably dull or matte surface may be provided for this purpose.

Reference is now made to Fig. 3 wherein the horizontal undulations of the waves are shown in plan view. As indicated in this figure, the maximum angle between the surface of the wave and the vertical plane 18, parallel to the image reflecting face of the screen, is preferably of the order of 22½° measured in a horizontal plane. Thus, rays of light originating in the projector and reflected from the indicated portion of each wave surface will be reflected laterally at an angle of about 45° to members of the viewing audience positioned off to one side of the screen. In addition to the lateral reflection caused by the wave shape of the reflecting surface, the transverse concavity of that same surface effects a concentration or focusing of the light to present a discrete bright spot to the viewer rather than a vertical band of diffused light.

While a limited number of specific embodiments of the invention have been shown and described herein, it is to be understood that many other embodiments may be resorted to without departing from the invention as defined in the appended claims.

I claim:

1. A moving picture screen having a forwardly facing image reflecting face, said face comprising a plurality of relatively narrow vertically adjacent smoothly undulating surfaces extending horizontally thereacross, each of said narrow surfaces being of wave form undulating in a direction generally normal to said reflecting face, all portions of each of said narrow surfaces being forwardly concave in vertical section.

2. A moving picture screen as defined in claim 1 wherein the uppermost edge portions of each of said narrow surfaces are located forwardly of the lowermost edge portions immediately therebelow.

3. A moving picture screen as defined in claim 1 wherein the upper and lower edge portions of each of said narrow surfaces slope upwardly and forwardly of said reflecting face and wherein the said upper edge portions slope forwardly at a greater angle from the vertical than the said lower edge portions.

4. A moving picture screen as defined in claim 1 wherein the lower edges of the crests of the waves of each of said narrow surfaces are in vertical alignment with the upper edges of the troughs of the waves in the next lower narrow surface, said plurality of narrow surfaces being arranged to define a substantially vertical image reflecting face for said screen.

5. A moving picture screen as defined in claim 1 wherein the upper and lower edges of said narrow surfaces substantially coincide with the adjacent edges of adjacent narrow surfaces, said plurality of narrow surfaces being arranged to define an image reflecting face for said screen sloping upwardly and forwardly from the vertical.

6. A moving picture screen as defined in claim 1 wherein the forward faces of said narrow surfaces are vertically grained whereby to partially diffuse light reflected horizontally therefrom without substantial diffusion in a vertical direction.

7. A moving picture screen comprising, a plurality of ribbon-like strips of sheet metal arranged in edge-to-edge relation, adjacent edges of said strips being integrally joined, corresponding faces of said strips defining an image reflecting face for said screen, each of said strips being of wave form undulating in a direction transverse to said image reflecting face, each of said strips being further of arcuate section in all planes perpendicular to said adjacent edges with the concave sides thereof defining said image reflecting face.

8. A moving picture screen as defined in claim 7 wherein said strips are integrally joined only at spaced junctures, said junctures joining the edges of wave crests of one strip to edges of wave troughs of an adjacent strip, whereby said screen is provided with a plurality of upwardly facing openings through the image reflecting face thereof with the boundaries of each of said openings defining a plane substantially perpendicular to said image reflecting face.

9. A moving picture screen as defined in claim 7 wherein said adjacent edges are joined throughout their lengths and wherein the edges of the troughs and crests of waves in adjacent strips coincide.

References Cited in the file of this patent

UNITED STATES PATENTS

| | | |
|---|---|---|
| 1,279,262 | Clark | Sept. 17, 1918 |
| 1,535,985 | Clark | Apr. 28, 1925 |
| 1,550,880 | Clark | Aug. 25, 1925 |
| 1,676,553 | Hewitt | July 10, 1928 |
| 1,828,749 | Raven | Oct. 27, 1931 |
| 1,854,864 | Semenitz | Apr. 19, 1932 |
| 1,985,460 | Raven | Dec. 25, 1934 |
| 1,995,964 | Darimont | Mar. 26, 1935 |
| 2,053,173 | Astima | Sept. 1, 1936 |
| 2,132,904 | Martinez et al. | Oct. 11, 1938 |
| 2,152,297 | Wilson | Mar. 28, 1939 |